United States Patent Office 3,491,129
Patented Jan. 20, 1970

3,491,129
PREPARATION OF 19-NOR-Δ⁴-3-ONE STEROIDS
Francisco Alvarez and Otto Halpern, Palo Alto, Calif., assignors to Syntex Corporation, Panama, Panama, a corporation of Panama
No Drawing. Filed Jan. 4, 1966, Ser. No. 518,558
Int. Cl. C07c 171/06; A61k 17/00
U.S. Cl. 260—397.3                16 Claims

ABSTRACT OF THE DISCLOSURE

Process for peparing 19-nor-Δ⁴-3-one steroids which involves the steps of introducing a chlorine or bromine atom into the C-5 position of a 3β-hydroxy-19-norΔ⁵⁽¹⁰⁾ steroid and oxidation of the thus-obtained novel 5α-chloro or 5α-bromo steroid followed by dehydrohalogenation.

---

This invention relates to a novel process for the preparation of 19-nor-Δ⁴-3-one steroids and to certain intermediates thereof.

More particularly, this invention relates to a novel process for the preparation of 19-nor-Δ⁴-3-one steroids of the androstane and pregnane series from the corresponding 19-norandrost-5(10)-en-3β-ol steroids or 19-norpregn-5(10)-en-3β-ol steroids and to certain novel 5α-halo intermediates thereof.

The following is a diagrammatic illustration showing the preparation of 19-nor-Δ⁴-3-one steroids in accordance with the present invention. For the sake of simplicity, only the A ring of the steroid nucleus is shown. X represents chlorine or bromine.

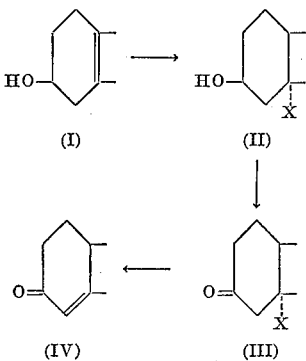

The 19-nor-Δ⁴-3-one steroids are compounds of great importance due to their potent progestational activity. Several processes for the production of these compounds have been reported; however, these processes are generally accompanied by the formation of estrone along with the desired 19-nor-Δ⁴-3-one steroid. In order to obtain the 19-nor-Δ⁴-3-one steroid in pure form for use, the estrone must be separated from the product mixture which is extremely difficult to accomplish. In addition, the necessary separation and purification results in a decreased yield of the desired steroid.

The present invention provides an effective solution to the foregoing problem by means of a novel process for the preparation of 19-nor-Δ⁴-3-one steroids which is not accompanied by the formation of estrone or other contaminants that are difficult to separate from the desired product.

The first step in the above illustrated process involves introducing a chlorine or bromine atom, preferably bromine into the C-5 position of the starting compound (I), e.g., 3β-hydroxy-19-norandrost-5(10)-en-17-one, to obtain the corresponding 5α-halo steroid (II). This halogenation reaction generally results in the formation of a mixture of the 5α-halo steroid together with a minor amount of the corresponding 10β-halo steroid. The 5α- and 10β-halo compounds can be separated easily by chromatography or by fractional crystallization at this point, but preferably will be used in admixture as the starting material for the next step. This halogenation reaction is carried out by dissolving the steroid starting material in an organic solvent which is substantially inert to dry hydrogen chloride or hydrogen bromide, and preferably a substantially non-polar organic solvent or solvent mixture, e.g., an aromatic hydrocarbon such as benzene, toluene or xylene, a chlorinated hydrocarbon such as methylene dichloride, chloroform, carbontetrachloride or chlorobenzene, mixtures of chlorinated hydrocarbons with alkanes such as pentane, hexane or heptane, e.g., a mixture of chloroform and hexane, an ether such as diethylether, dioxane or tetrahydrofuran, or the like, as well as mixtures of the foregoing solvents, and then treating the thus-obtained solution with substantially anhydrous hydrogen chloride or hydrogen bromide to form the corresponding 5α- and 10β-halo compounds. The hydrogen chloride or hydrogen bromide can be added as a solution in one or more of the aforementioned solvents, or bubbled through the reaction sphere in gaseous form, or generated in situ, e.g., hydrogen chloride can be generated by the action of small amounts of moisture on phosgene, and will be present in at least the amount necessary to hydrochlorinate or hydrobrominate the 5(10)-double bond in the steroid starting material, i.e., on at least a mol-for-mol basis with the steroid starting material.

This reaction is preferably carried out under substantially anhydrous conditions, although as mentioned hereinabove, moisture which will combine with another substance to generate hydrogen halide can be present in amounts sufficient for this purpose. Reaction temperatures ranging from about −10° C. or lower to about 30° C., and preferably from about 15° C. to room temperature (about 20–25° C.) will generally be used, although higher or lower temperatures can also be employed, if desired, with the rate of reaction being affected correspondingly.

The halogenation reaction will usually be continued until no further uptake of hydrogen halide takes place. For example, a reaction carried out by bubbling dry hydrogen chloride gas at a temperature of from about 15° C. to about 25° C. (and at a rate of from about 0.1 to 1 liter per minute or more) through a solution of 1 mol of the steroid starting material in, for example, chloroform/hexane (1:1 by volume) will generally go to completion in from about 10 to 60 minutes.

The reaction conditions given hereinabove, other than the requirement that an organic solvent which is substantially inert to dry hydrogen chloride or hydrogen bromide be used, are not critical, but merely represent the best mode contemplated of carrying out the invention.

The 5α-halo steroid (II), either alone or in admixture with the corresponding 10β-halo steroid, is then oxidized to transform the 3β-hydroxyl group to a keto group, thus producing the corresponding 5α-halo-19-nor-3-one steroid (III) alone or in admixture with the corresponding 10β-halo-19-nor-3-one steroid. The 10β-halo steroid, if present, can be separated at this point from the 5α-halo steroid by chromatography or fractional crystallization, but preferably both halogenated steroids will be used in admixture as the starting material for the next step.

This step, the oxidation reaction, is carried out in a known manner, for example, using chromium trioxide in an aqueous organic solvent medium which is neutral or acidic such as, for example, pyridine, acetic acid, a mixture of acetic acid and a chlorinated hydrocarbon such as methylene dichloride and similar solvent medium, at for example, from about 15° C. to about 25° C. for from about 2 to 5 hours or more. Preferably, the medium is substantially neutral to slightly acidic. Caution should be exercised in not using a too strongly acidic medium so as to cause undesirable side reactions such as removal of the 5α-halo substituent or undesired oxidation of other substituents. Other oxidation means may be utilized such as manganese dioxide in, for example, chloroform. Preferably, the oxidation step is accomplished using Jones reagent which involves the use of about 8 N chromic acid in a ketone solvent such as acetone, methylethyl ketone, and the like, preferably the former, at a temperature of from about −10° C. to about room temperature, preferably at about 0° C.

As is characteristic of oxidation reactions of steroids in general, depending upon the starting compound, the final compound sought and the oxidation conditions, it may be desirable to introduce a protecting group before carrying out oxidation of the 3β-hydroxy compound. Thus, for example, when the steroid contains a hydroxyl group at, for example, the 17-carbon position, it may be desirable before carrying out the oxidation reaction to first introduce a protecting group, such as, for example, by reaction of the halogenated steroid with dihydropyranyl ether to protect against oxidation of the 17-position. Thereafter, if desired, the protecting group may be removed in a conventional manner such as, for example, by treatment with aqueous mineral acid.

The reaction conditions and reagents given hereinabove to accomplish oxidation, i.e. transformation of the 3β-hydroxy steroid to the corresponding 3-keto steroid, are neither critical nor exclusive. Other conditions and reagents will be apparent to those of ordinary skill in the art upon consideration of the disclosure of the present invention provided herein; the above merely representing the best mode contemplated of carrying out the invention.

The thus-obtained 5α-halo-19-nor-3-one steroid (III), either alone or together with the corresponding 10β-halo-19-nor-3-one steroid, is then dehydrohalogenated to obtain the 19-nor-Δ⁴-3-one steroid (IV), either alone or in admixture with the unchanged 10β-halo-19-nor-3-one steroid. The 10β-halo steroid, if present, can then easily be separated from the final product by chromatography or fractional crystallization.

The step of dehydrohalogenation can be accomplished by treating the 5α-halo-19-nor-3-one steroid in an alcoholic solution of a base, for example, an alkali or alkaline earth metal hydroxide, carbonate, bicarbonate or acetate such as sodium or calcium hydroxide, potassium or calcium carbonate, calcium or sodium acetate, and the like, preferably an alkali hydroxide or acetate, in a lower alcohol such as methanol, ethanol, and the like, at a temperature of from about −5° C. to about 100° C., preferably about 0° C. to about 60° C., for from about 30 minutes or less to about 7 hours or more depending upon such factors as temperature and concentration of reactants. The base should be present in an amount sufficient to provide at least a mol-for-mol ratio of the base with the halogenated steroid. Other dehydrohalogenation methods may be employed such, for example, an alkaline earth carbonate in a solvent such as dimethylformamide or dimethylacetamide.

Transformation of the 5α-halo steroid (II) alone or in admixture with the 10β-halo steroid to the 19-nor-Δ⁴-3-one steroid (IV) can be accomplished directly by Oppenauer oxidation of the former. As is true in the preferred method of the present invention described hereinabove, it may be desirable, as is well known to those of ordinary skill in the art, to introduce a protecting group when the steroid contains a hydroxyl function in addition to the 3β-hydroxyl before carrying out the Oppenauer oxidation.

Transformation of the 5α-halo steroid (II) to the 19-nor-Δ⁴-3-one steroid (IV) directly by Oppenauer oxidation may be carried out in an aromatic hydrocarbon/ketone solvent medium containing aluminum isoproxide, t-butoxide, phenoxide, or isobutoxide at room temperature or at elevated temperatures, preferably under reflux conditions. Suitable solvent media include, for example, benzene or toluene in admixture with a ketone such as, acetone or cyclohexanone. Preferably, the reaction is accomplished with aluminum isopropoxide in toluene/cyclohexanone under reflux conditions, the ratio of toluene/cyclohexanone being such as to form a solution of the steroid or preferably about 5:1 by volume, respectively.

The novel process of the present invention may be practiced using any 19-nor-Δ⁵⁽¹⁰⁾-3β-hydroxy steroid as the starting material. Preferred starting materials are the 19-nor-Δ⁵⁽¹⁰⁾-3β-hydroxy steroids of the androstane and pregnane series which by means of the present invention are converted to valuable progestational agents or intermediates for the preparation of valuable progestational agents. Exemplary of the preferred starting materials are the 19-nor-Δ⁵⁽¹⁰⁾-3β-hydroxy steroids characterized by the formula:

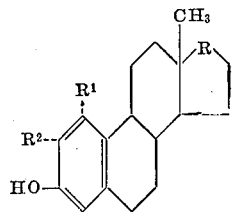

wherein R is a member selected from the group consisting of

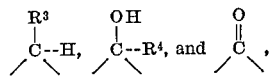

wherein $R^3$ is selected from the group consisting of

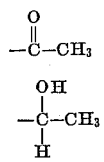

and an acyloxy group containing less than 12 carbon atoms, $R^4$ is selected from the group consisting of hydrogen, a lower alkyl group and a lower alkynyl group; and $R^1$ and $R^2$ are each selected from the group consisting of hydrogen and methyl.

The starting compounds characterized by the above formula include, for example, the following:

19-norandrost-5(10)-en-17β-acyloxy-3β-ol;

19-norpregn-5(10)-ene-3β,20β-diol;
19-norandrost-5(10)-ene-3β,17β-diol;
19-norandrost-5(10)-en-17α-lower alkyl-3β,17β-diol;
19-norandrost-5(10)-en-17α-lower alkynyl-3β,17β-diol;
3β-hydroxy-19-norpregn-5(10)-en-20one;
19-norandrost-5(10)-ene-2α-methyl-3β,17β-diol-17-benzoate; and
3β-hydroxy-19-norpregn-5(10)-en-20-one;

The acyloxy group is derived from hydrocarbon carboxylic acids containing less than 12 carbon atoms which may be saturated or unsaturated, of straight, branched, cyclic or cyclic-aliphatic or aromatic. Typical ester groups are the acetate, propionate, enanthate, benzoate, trimethylacetate, t-butylacetate, phenoxyacetate, cyclopentylpropionate, aminoacetate and β-chloropropionate.

The lower alkyl group includes, for example, methyl, propyl, butyl, ethyl, pentyl, hexyl and the branch-chained isomers thereof containing from 1 to about 6 carbon atoms.

The lower alkynyl group includes, for example, ethynyl, propynyl, butynyl, pentynyl, hexynyl and the branched chain isomers thereof containing from 1 to about 6 carbon atoms.

The following detailed examples are intended to illustrate and not to limit the scope of the present invention. Unless otherwise specified, proportions are given in parts by weight, reactions are conducted at room temperature and at normal atmospheric pressure, and temperature is given in degrees centigrade (uncorrected). Further, it is to be understood that the phraseology or terminology employed herein is for the purpose of description and not of limitation.

EXAMPLE 1

A solution of 10 g. of 3β-hydroxy-19-norandrost-5(10)-en-17-one in 100 ml. of anhydrous chloroform at about 0° C. was treated with a slow stream of anhydrous hydrogen bromide for a time sufficient to provide a slight excess on a mol-for-mol basis with the steroid (about 10 minutes). Thereafter, the reaction mixture was concentrated to dryness under vacuum and the residue (5α-bromo-3β-hydroxy-19-norandrostan-17-one with a minor amount of the corresponding 10β-bromo steroid) dissolved in 300 ml. of acetone which had been distilled over potassium permanganate. This solution was chilled to about 0° C. and thereafter 9 ml. of Jones reagent (i.e. 8 N chromic acid which was prepared by mixing 26 g. of chromium trioxide with 23 ml. of concentrated sulfuric acid and diluting with water to 100 ml.) was added dropwise over a period of about 10 minutes. After another 10 minutes at about 0° C., the reaction mixture was poured into 3 l. of ice-water containing 5 g. of sodium bisulfite and the product obtained as a solid was collected by filtration and dried at room temperature. Thus, there was obtained 5α-bromo-19-norandrostane-3,17-dione in admixture with a minor amount of 10β-bromo-19-norandrostane-3,17-dione. The solid mixture was dissolved into 100 ml. of methanol to which had been added a mixture of 3.2 g. of potassium hydroxide and 3 ml. of water and the resulting solution refluxed for 60 minutes. The reaction mixture was then neutralized by the addition of acetic acid, concentrated to about 30 ml., and diluted with about 500 ml. of water. The material that precipitated was collected by filtration and dried furnishing 19-norandrost-4-ene-3,17-dione together with a minor amount of the unconverted 10β-bromo-19-norandrostane-3,17-dione. The product mixture was separated by fractional crystallization from cyclohexanone giving 19-norandrost-4-ene-3,17-dione in pure form.

EXAMPLE 2

Forty five grams of 3β-hydroxy-19-norandrost-5(10)-en-17-one were dissolved in an anhydrous mixture of 200 ml. of chloroform and 300 ml. of hexane and then cooled to 5° C. in an ice-water bath. Next, a current of anhydrous hydrogen chloride was bubbled through the cooled solution at a rate of about six liters per minute for 30 minutes. Following this reaction period the resulting crystalline precipitate was collected by filtration, washed with chloroform and dried. Recrystallization from chloroform/hexane gave 5α-chloro-3β-hydroxy-19-norandrostan-17-one admixed with a minor amount of 10β-chloro-3β-hydroxy-19-norandrostan-17-one.

A portion of the above mixture of 5α-halo and 10β-halo steroids was carefully chromatographed by means of preparative two-dimensional thin layer chromatography, using a mixture of 2% by volume of diethyl ether and 98% by volume of methylene dichloride and then a mixture of 5% by volume of diethyl ether and 95% by volume of methylene dichloride as the eluants, thus giving the individual 5α-chloro steroid and 10β-chloro steroid in pure form.

A mixture of the thus prepared 5α-chloro steroid and 10β-chloro steroid in the amount of about 40 g. was admixed with 700 ml. of methylene dichloride, 16 ml. of water, and 155 ml. of aqueous 30% acetic acid and then cooled to 20° C. Next, a solution of 17.1 g. of chromium trioxide in a mixture of 13.5 ml. of water and 22.5 ml. of aqueous 30% acetic acid was added dropwise, with stirring, over a 30 minute period, while maintaining the temperature of the mixture at about 20–25° C. The resulting reaction mixture was then allowed to stand at ambient temperature for an additional 3.5 hours. Following this reaction period, the reaction mixture was diluted with 80 ml. of methylene dichloride and then washed twice with 160 ml. portions of water. The washings were combined and extracted three times with 50 ml. portions of methylene dichloride, and these extracts, combined with the methylene dichloride-diluted reaction mixture were then dried over anhydrous sodium sulfate and evaporated to dryness. Crystallization from acetone-hexane gave 5α-chloro-19-norandrostane-3,17-dione admixed with a minor amount of the corresponding 10β-chloro steroid. The individual steroids may be obtained in pure form by chromatography in the manner described above.

Twenty five grams of the above mixture of 5α-chloro and 10β-chloro steroids were suspended in 1.0 liter of a 1% solution of potassium hydroxide in methanol, and the resulting suspension was refluxed for 30 minutes. Thereafter, the suspension was poured into 10 liters of ice water, and the resulting precipitate was collected by filtration, washed with water until neutral, and then dried. Crystallization of this product from ethyl acetate gave 19-norandrost-4-ene-3,17-dione admixed with a minor amount of 10β-chloro-19-norandrostane-3,17-dione. The product mixture was separated in the manner described in Example 1 above.

EXAMPLE 3

A solution of 10 g. of 3β,17β-dihydroxy-17α-ethynyl-19-norandrost-5(10)-ene in 50 ml. of anhydrous chloroform was saturated with a slow stream of hydrogen chloride gas over a period of about 35 minutes. The resulting suspension was evaporated to dryness, the residue taken up in acetone and reevaporated. One hundred milliliters of toluene and 20 ml. of cyclohexanone were added to the residue, the resulting mixture azeotroped, and thereafter 2 g. of aluminum isopropoxide were added. The mixture was then refluxed for about 20 minutes and thereafter poured into about 500 ml. of water which contained 6 ml. of concentrated HCl. The reaction mixture was then concentrated by steam distillation, cooled, and filtered. The filtered solid was dried by suction, taken up in about 30 ml. of hot acetone, cooled in a dry-ice bath and filtered. The filtered solid material was dried affording 17α-ethynyl-17β-hydroxy-19-norandrost-4-en-3-one which may be further purified by conventional chromatography techniques or fractional crystallization.

EXAMPLE 4

Example 1 was repeated using as the starting material 3β-hydroxy-19-norpregn-5(10)-en-20-one; 19-norandrost-5(10)-ene-17α-methyl-3β-ol; 19 - norpregn-5(10)-ene-3β, 20β-diol; 19-norandrost-5(10)-en-3β,17β-diol-17-benzoate; 19-norandrost-5(10)-ene-2α-methyl - 3β,17β-diol-17-benzoate; and 17α-ethynyl-19-norandrost-5(10)-ene-3β,17β-diol affording the corresponding 3β-hydroxy-5α-bromo intermediate, the corresponding 3-keto-5α-bromo intermediate, and the corresponding 19-nor-$\Delta^4$-3-one steroid, respectively.

EXAMPLE 5

Example 2 was repeated with the exception that the starting material was 1α,17α-dimethyl-19-norandrost-5 (10)-ene-3β, 17β-diol; 19-norandrost-5(10)-ene-3β,17β-diol-17-acetate; 19-norandrost-5(10)-en-3β,17β-diol; and 3β-hydroxy-19-norpregn-5(10)-en-20-one affording, respectively, the corresponding 3β-hydroxy-5α-chloro intermediate, the corresponding 3-keto-5α-chloro intermediate, and the corresponding 19-nor-$\Delta^4$-3-one steroid.

What is claimed is:

1. A process for the preparation of a 19-nor-$\Delta^4$-3-one steroid of the androstane and pregnane series from the corresponding 3β-hydroxy-19-nor-$\Delta^{5(10)}$ steroid which comprises the steps of:

(a) hydrohalogenation of said 3β-hydroxy-19-nor-Δ$^{5(10)}$ steroid with a halogenating agent selected from the group consisting of hydrogen bromide and hydrogen chloride in a nonpolar organic solvent medium substantially inert to said halogenating agent to obtain the corresponding 5α-halo-3β-hydroxy-19-nor steroid;

(b) oxidation of said 5α-halo-3β-hydroxy-19-nor steroid to obtain the corresponding 5α-halo-19-nor-3-one steroid; and (c) dehydrohalogenation of said 5α-halo-19-nor-3-one steroid by treatment with a base to obtain the corresponding 19-nor-Δ$^4$-3-one steroid.

2. A process according to claim 1 wherein said substantially inert solvent medium is selected from the group consisting of chlorinated hydrocarbons, hydrocarbons, ethers and mixtures thereof; said oxidation is accomplished by reacting said 5α-halo-3β-hydroxy-19-nor steroid with about 8 N chromic acid in a ketone solvent medium to obtain the corresponding 5α-halo-19-nor-3-one steroid; and said dehydrohalogenation is accomplished by treating said 5α-halo-19-nor-3-one steroid in a lower alcohol with a base selected from the group consisting of alkali metal and alkaline earth metal hydroxides, carbonates, bicarbonates, and acetates to obtain the corresponding 19-nor-Δ$^4$-3-one steroid.

3. A process according to claim 1 wherein said solvent medium is selected from the group consisting of chlorinated hydrocarbons, hydrocarbons, ethers and mixtures thereof; said oxidation is accomplished by reacting said 5α-halo-19-nor-3-one steroid with about 8 N chromic acid in a ketone solvent medium; and said dehydrohalogenation is accomplished by treating said 5α-halo-19-nor-3-one steroid with an alkaline earth carbonate in a solvent selected from the group consisting of dimethylformamide and dimethylacetamide.

4. A process according to claim 2 wherein said inert solvent is anhydrous chloroform, said hydrohalogenating agent is anhydrous hydrogen bromide, said ketone is acetone, said alcohol is methanol, and said base is an alkali acetate.

5. A process according to claim 4 wherein said 3β-hydroxy-19-nor-Δ$^{5(10)}$ steroid is 3β-hydroxy-19-norandrost-5(10)-en-17-one.

6. A process according to claim 3 wherein said 3β-hydroxy-19-nor-Δ$^{5(10)}$ steroid is 3β-hydroxy-19-norandrost-5(10)-en-17-one.

7. A process according to claim 6 wherein said oxidation is accomplished by treating said 5α-halo-3β-hydroxy-19-nor steroid in an aqueous organic solvent medium with chrominum trioxide to obtain the corresponding 5α-halo-19-nor-3-one steroid.

8. A process according to claim 7 wherein said solvent medium is neutral to slightly acidic.

9. A process for the preparation of a 19-nor-Δ$^4$-3-one steroid of the androstane and pregnane series from the corresponding 3β-hydroxy-19-nor-Δ$^{5(10)}$ steroid which comprises the steps of (a) hydrohalogenation of said 3β-hydroxy-19-nor-Δ$^{5(10)}$ steroid with a halogenating agent selected from the group consisting of hydrogen bromide and hydrogen chloride in a non-polar organic solvent medium substantially inert to said halogenating agent to obtain the corresponding 5α-halo-3β-hydroxy-19-nor steroid; and (b) oxidation of said 5α-halo-3β-hydroxy-19-nor steroid by reaction thereof with a member selected from the group consisting of aluminum phenoxide, isoproxide, t-butoxide, and isobutoxide in a solvent medium of an aromatic hydrocarbon and a ketone to obtain the corresponding 19-nor-Δ$^4$-3-one steroid.

10. A process according to claim 9 wherein said member is aluminum isopropoxide.

11. A process according to claim 10 wherein said ketone is cyclohexanone and said aromatic hydrocarbon is benzene.

12. A process according to claim 10 wherein said hydrocarbon is toluene and said ketone is cyclohexanone.

13. A compound of the formula

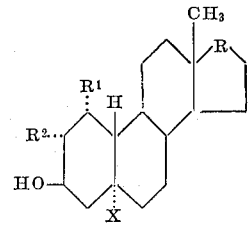

wherein X is selected from the group consisting of bromine and chlorine; R is the group

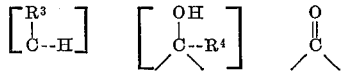

and R$^1$ and R$^2$ are each selected from the group consisting of hydrogen and methyl, provided that when one of R$^1$ and R$^2$ is methyl, the other is hydrogen.

14. A compound according to claim 13 wherein R$^1$ and R$^2$ are hydrogen.

15. A compound according to claim 14 wherein X is chlorine.

16. A compound according to claim 14 wherein X is bromine.

References Cited

UNITED STATES PATENTS

| | | | |
|---|---|---|---|
| 3,299,106 | 1/1967 | Alvarez | 260—397.4 |
| 3,071,602 | 1/1963 | Bowers | 260—397.3 |
| 3,301,877 | 1/1967 | Alvarez | 260—397.3 |

ELBERT L. ROBERTS, Primary Examiner

U.S. Cl. X.R.

260—397.4, 397.5

UNITED STATES PATENT OFFICE
CERTIFICATE OF CORRECTION

Patent No. 3,491,129　　　　　Dated　January 20, 1970

Inventor(s)　Francisco Alvarez and Otto Halpern

It is certified that error appears in the above-identified patent and that said Letters Patent are hereby corrected as shown below:

Column 1, line 12, "peparing" should read --preparing--.

Column 4, lines 20 to 25, the formula should appear as follows:

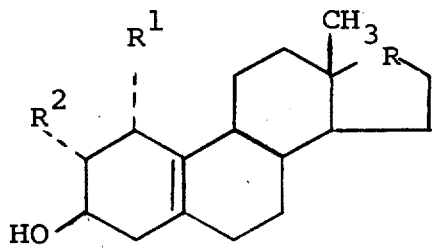

Column 4, line 55, "20one" should read --20-one

Column 4, cancel line 59 and replace with -- 3β-hydroxy-19-norandrost-5(10)-en-17-one--.

Column 7, line 47, "6" should read --2--.

Column 8, lines 35 to 38, cancel the material in brackets depicted as follows:

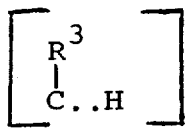 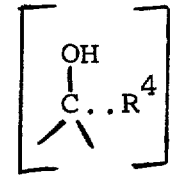

Signed and sealed this 30th day of June 1970.

(SEAL)
Attest:
EDWARD M. FLETCHER, JR.
Attesting Officer

WILLIAM E. SCHUYLER, JR.
Commissioner of Patents